United States Patent [19]

Witt et al.

[11] Patent Number: 5,875,908
[45] Date of Patent: Mar. 2, 1999

[54] BOTTLE CAP

[75] Inventors: Stephen H. Witt, Smithville; Miles Colin Keller, Toronto, both of Canada

[73] Assignee: Stanpac Inc, Canada

[21] Appl. No.: 812,493

[22] Filed: Mar. 7, 1997

[51] Int. Cl.$^6$ ................................... B65D 41/48
[52] U.S. Cl. .......................... 215/256; 215/258; 215/305
[58] Field of Search ..................... 215/250, 252, 215/253, 254, 255, 256, 257, 258, 317, 319, 320, 321, 354, 901, 230, DIG. 1, 305

[56] References Cited

U.S. PATENT DOCUMENTS

| | | | |
|---|---|---|---|
| 2,814,405 | 11/1957 | Edwards . | |
| 3,622,028 | 11/1971 | Lohrer | 215/258 X |
| 4,362,253 | 12/1982 | Wortley et al. | 215/256 X |
| 4,394,918 | 7/1983 | Grassen . | |
| 4,522,308 | 6/1985 | Sullivan | 215/254 X |
| 4,921,113 | 5/1990 | Dubach | 215/304 X |
| 4,951,830 | 8/1990 | Cochrane | 215/256 |
| 5,094,357 | 3/1992 | McKinney . | |
| 5,249,704 | 10/1993 | Boetzkes | 215/256 X |
| 5,310,069 | 5/1994 | Ingram et al. | 215/252 |

FOREIGN PATENT DOCUMENTS

| | | | |
|---|---|---|---|
| 515115 | 10/1952 | Belgium . | |
| 2497770 | 7/1982 | France | 215/256 |
| 3911537 | 2/1990 | Germany . | |
| 553103 | 12/1956 | Italy | 215/254 |
| 1038327 | 1/1965 | United Kingdom . | |
| 1357554 | 6/1974 | United Kingdom | 215/253 |
| 88/03116 | 5/1988 | WIPO | 215/256 |

*Primary Examiner*—Stephen K. Cronin
*Assistant Examiner*—Nathan Newhouse
*Attorney, Agent, or Firm*—Ridout & Maybee

[57] ABSTRACT

A one piece molded push on tamper resistant closure suited for reusable bottles such as rnilk bottles comprises a cap portion and a latch ring portion connected thereto by frangible tabs. Rupture of the tabs serves to detach the cap portion to permit its removal from the bottle, while simultaneously opening the latch ring portion to permit it to be removed laterally from about the neck of the bottle. The closure may also include a pull tab disposed on the cap portion to provide a levered fore for rupturing the frangible tabs.

16 Claims, 4 Drawing Sheets

BOTTLE CAP

FIELD OF INVENTION

This invention relates to tamper resistant push on assemblies for containers. It is particularly useful in connection with re-usable glass bottles such as milk bottles, but not necessarily limited to such use.

BACKGROUND OF INVENTION

Bottles in the nature of milk bottles have heretofore been closed with friction fitted cardboard disks, crimped on aluminium foil caps and crimped on paper caps, none of which are tamper resistant.

Tamper resistant closures are known for plastic bottles. One such proposal is advanced in British Patent 1,038,327 and includes a latch ring, a cap and a hinge band disposed between the cap and latch ring. This closure is required to be assembled onto the neck of the bottle and is not readily adapted for use with existing milk bottles and milk bottling machinery.

German Patent 3911537 describes a tamper resistant closure which includes a latch ring and screw cap, with frangible tabs and a seal therebetween. The latch ring is provided with radially angled teeth which are intended to coact with teeth on the bottle neck, to permit the latch ring to rotate on the neck in a clockwise direction, but which precludes its rotation in an anticlockwise direction.

U.S. Pat. No. 4,394,918 describes a one piece tamper resistant closure for screw bottles which includes a latch ring with axially angled teeth and frangible tabs which bridge between the latch ring and screw cap, and a hinge which interconnects the latch ring and screw cap. When the cap is initially unscrewed, the latch ring will pivot about the hinge, and a considerable mechanical advantage will be generated which will assist in rupturing the frangible tabs.

Re-usable glass bottles such as milk bottles have traditionally used push on type closures, and it would involve a major capital cost to convert to screw type bottles. Moreover, it is impractical to provide in these types of bottles expedients such as ratcheting teeth. The diameter of the necks of these bottles is relatively large, and given the relatively wide tolerances to which the bottles are manufactured, it has been generally thought necessary to use some type of crimping operation to provide an adequate seal. Generally speaking, the closures of the prior art milk bottles have been of a type whereby they provide an inadequate re-closing function following their initial removal from the bottle.

It will be appreciated that where a tamper resistant feature of a push-on closure involves the use of frangible tabs, reliance cannot be made on the mechanical advantage provided by screw threads to generate a force that is adequate for their rupture.

Where the bottles to which the bottle caps are to be fitted are returnable for re-use, it is undesirable that the latch ring remains firmly attached to the bottle following the removal of the bottle cap.

It is a primary object of this invention to provide a one piece molded tamper resistant push-on closure that is suited for closing glass bottles.

It is another object of this invention to provide such closures which do not necessitate assembly on the neck of the bottle, and which accordingly, are readily adaptable for use with existing closure machinery.

It is yet another object of this invention to provide such closures with frangible members that can be ruptured without the necessity of using excessive force.

It is still a further object of this invention to provide such closures that are easily removable to permit the re-use of the bottle.

It is a still further object of this invention to provide closures of the above type that provide a good re-closure following their initial removal.

SUMMARY OF THE INVENTION

In accordance with a broad aspect of the invention, a one piece molded tamper resistant push-on closure suitable for closing glass bottles comprises a latch ring portion having an upper and a lower peripheral margin and an inwardly directed surface extending therebetween, and a plurality of resiliently deformable, upwardly inwardly directed teeth disposed thereon, suitably adjacent to the lower peripheral margin. The closure further comprises a cap portion having a lower peripheral margin and an inwardly directed surface extending upwardly from the lower peripheral margin thereof. A plurality of frangible tabs connect between the latch ring portion and the cap portion. A detent tab is forwardly disposed on the latch ring portion and a pull tab is disposed forwardly on the cap portion and connected thereto by a hinge which permits the pull tab to swing between a first, stored position wherein it is engaged with the detent tab and a second position wherein it projects forwardly from the cap portion so as to be graspable.

The pull tab when swung to its forward position permits it to be grasped and a manual force applied thereto to provide some mechanical advantage in rupturing the frangible tabs. This force is applied at one radial point rather than being applied about the whole of the periphery of the cap, and will result in the more or less serial rupture of the frangible tabs, rather than their being ruptured simultaneously. Accordingly, it is found that the force necessary to disengage the cap from the latch ring using the pull tab is well within the capability of the average person, while the cumulative force is sufficiently high as to reduce the likelihood of an inadvertent detachment.

Suitably and preferably, the pull tab is in the form of a ring. This has several advantages, one of which is that it will permit the detent tab to enter into an interlocking engagement with the pull tab and increase the structural integrity of the closure. Suitably, an adhesive seal bridges across the tabs, which seal is broken upon disengagement of the tabs, thereby providing a second level of tamper resistance to the closure.

The pull tab when in the form of a ring will also permit the engagement of common household articles therewith serving to increase the mechanical advantage should this be desired.

Generally speaking, the upper end of the cap portion will be in the form of a flat dome, and suitably a stopper will depend downwardly from the dome to provide a liquid tight seal with the interior surface of the bottle. Desirably, the stopper will have a tubular cross-section so as to be resiliently deformable and accommodate normal variations found in glass milk bottles, for example. Also preferably, the stopper will have a maximum external diameter intermediate the axial ends thereof so as to facilitate the initial engagement of the stopper in the neck of the bottle and to localize sealing forces.

Preferably, the latch ring is provided on the inwardly directed surface thereof which blind portals associated with respective ones of the teeth whereby the teeth may resiliently deform and enter the portals as the latch ring is push fitted over the neck of a bottle. Accordingly, the latch ring can accommodate the relatively wide tolerances normally found in glass bottles in the nature of milk bottles.

Also preferably, the latch ring is in the form of an open annulus which permits its ready removal from the neck of a bottle once the frangible tabs have been ruptured.

The cap portion is preferably provided with one or more pluralities of small ribs on the inwardly facing surface thereof, with each plurality being formed on a diameter of the cap. The ribs are positioned so as to engage with a shouldered portion normally associated with glass bottles such as milk bottles and will serve to retain the cap in a re-sealed relationship on the bottle.

The foregoing objects and aspects of the invention, together with other objects, aspects and advantages thereof will be more apparent from a consideration of the following description of the preferred embodiment thereof taken in conjunction with the drawings annexed hereto.

DESCRIPTION OF THE PREFERRED EMBODIMENT

Figure 1:
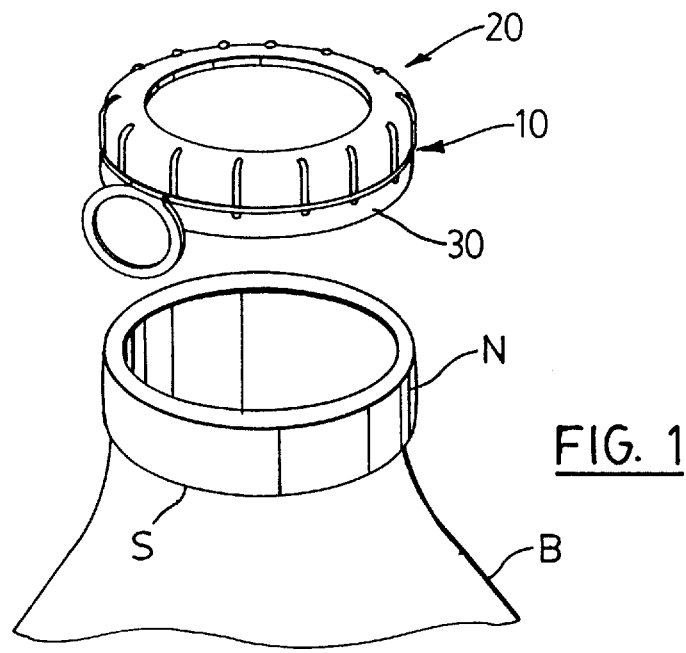
FIG. 1 shows a bottle cap in accordance with the invention in perspective view, together with a portion of a milk bottle.

Referring to the drawings in detail, a bottle closure in accordance with the invention is denoted generally by the numeral 10. Bottle closure 10 comprises a cap portion 20 defined in part by a lower peripheral margin 22, a cover 24 and an inwardly directed surface 26 extending therebetween.

Closure 10 further comprises a latch ring portion 30 defined in part by a lower peripheral margin 32, an upper peripheral margin 34, and an inwardly directed surface 36 therebetween. A plurality of resiliently deformable teeth 38 depend upwardly inwardly from the lower peripheral margin 32 of the latch ring. A similar plurality of blind portals 40 are disposed rearwardly of respective ones of teeth 38 on the inwardly directed surface 36 of the latch ring portion, which portals extend upwardly into the inwardly directed surface 26 of the cap portion 20 adjacent the lower peripheral margin 22 thereof, the portals being dimensioned such that teeth 38 can be deformed into the respective portals when the closure 10 is push fitted onto a bottle neck, as will be further described.

Figure 2:
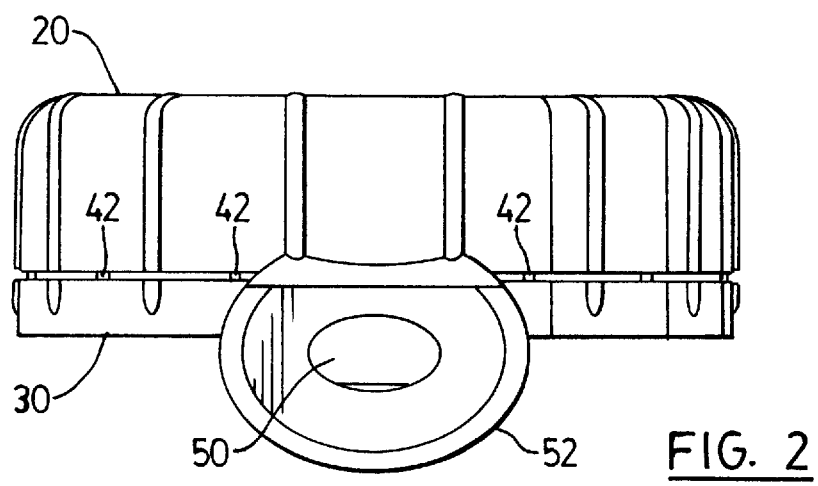
FIG. 2 shows the bottle cap of FIG. 1 in front elevation.
Figure 3:
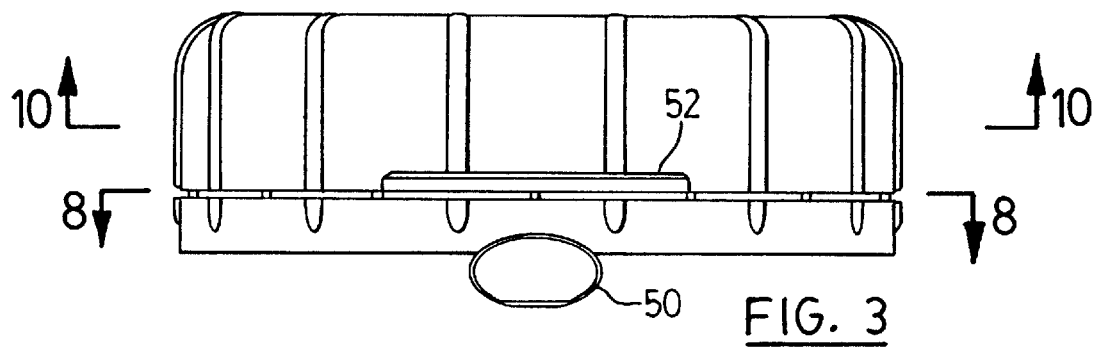
FIG. 3 is similar to FIG. 2, but shows the bottle cap in its as-molded condition.
Figure 4:
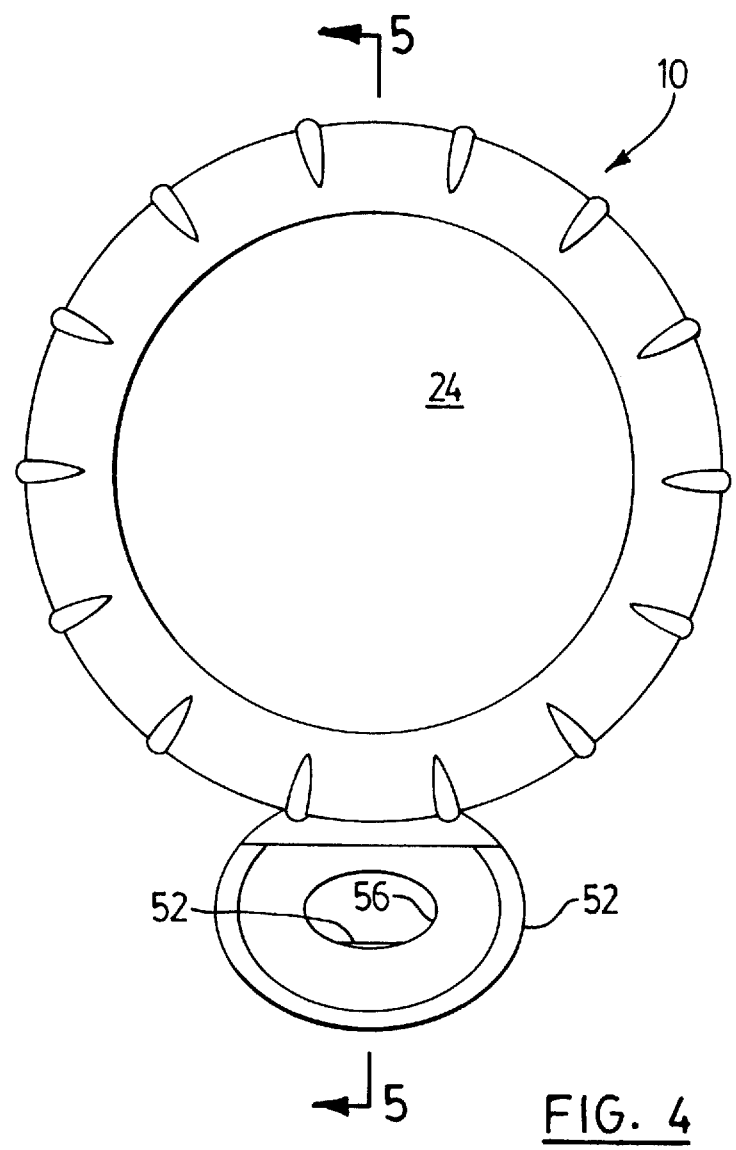
FIG. 4 is a plan view from above of the bottle cap of FIG. 3.
Figure 7:
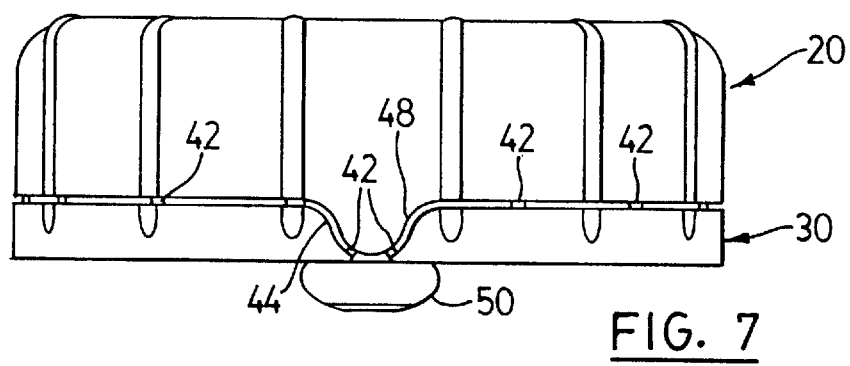
FIG. 7 shows the bottle cap of FIG. 3 in rear elevation.
Figure 5:
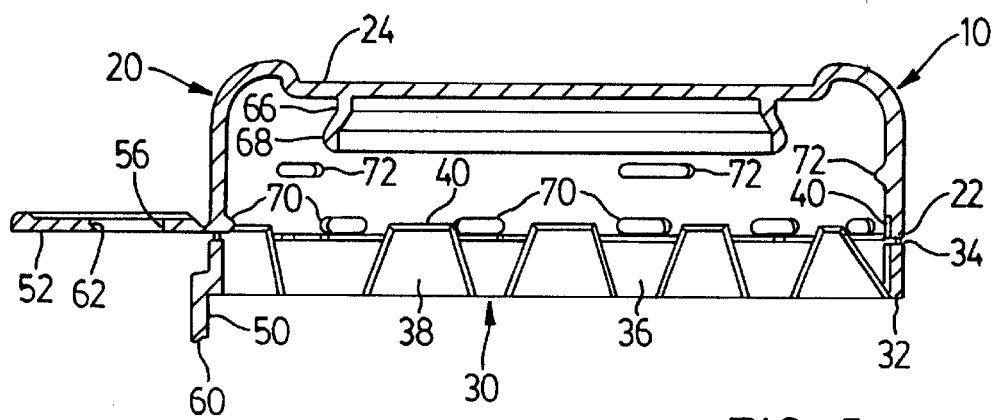
FIG. 5 is a section on line 5—5 of FIG. 4, in the direction of the arrows.
Figure 6:
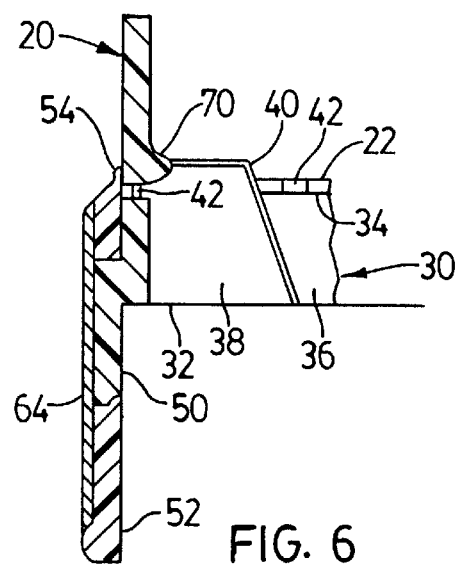
FIG. 6 shows the left hand portion of FIG. 5 on larger scale, with the tabs in interlocked relation and a seal applied.
Figure 10:
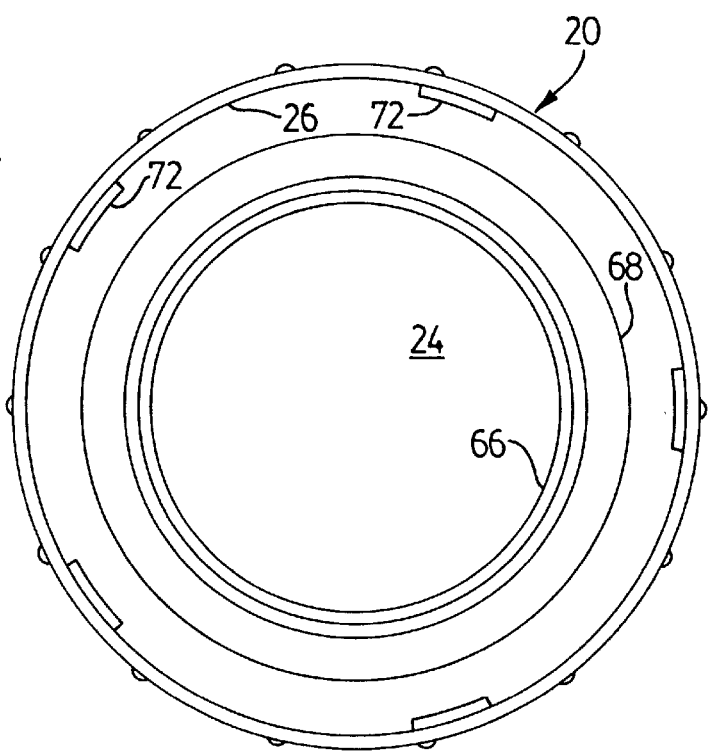
FIG. 10 is a section in the horizontal plane containing line 10—10 of FIG. 3.
Figure 8:
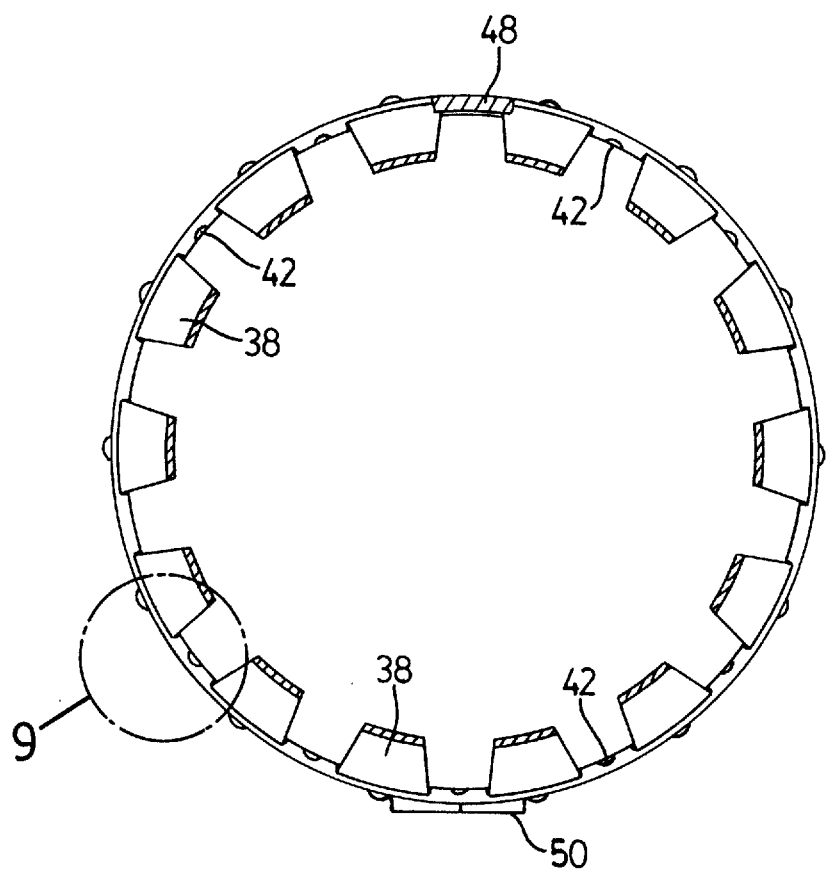
FIG. 8 is a section in the horizontal plane containing line 8—8 of FIG. 3 in the direction of the arrows.
Figure 9:
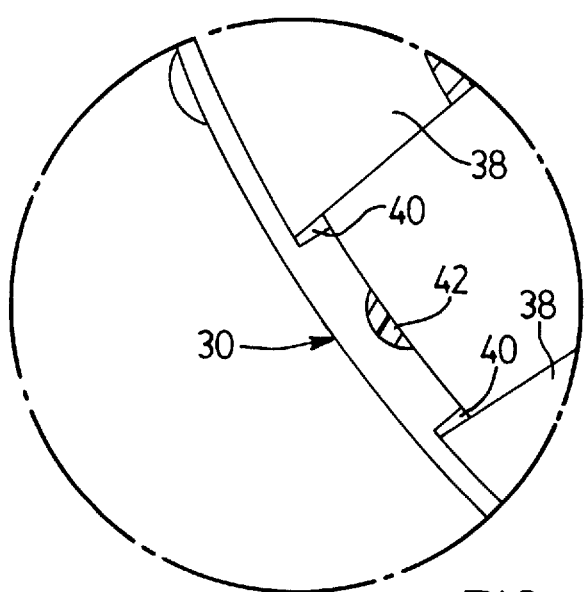
FIG. 9 shows the portion enclosed in dotted outline in FIG. 8 in larger scale.

A plurality of frangible tabs 42 interconnect the upper peripheral margin 34 of the latch ring portion 30 to the lower peripheral margin 22 of the cap portion 20, to integrate the two portions. The plurality of frangible tabs 42 and spacing therebetween is conveniently similar to the plurality of teeth 38, to facilitate the molding of closure 10. However, as best seen in FIG. 7, latch ring portion 30 is in the form of an open annulus, a discontinuity being formed by a generally U shaped opening 44 located at the rearwardly facing side thereof, which opening intersects both the lower and the upper peripheral margins 32, 34 of the latch ring portion. Cap portion 20 is provided with a U shaped extension 48 adjacent the lower peripheral margin 22 thereof, and frangible tabs 42 are spaced relatively closely where they bridge the upper margins of the U shaped opening 44 to the lower margin of the mating extension 48 to provide a structural rigidity to the latch ring portion 30 until such time as the cap portion 20 is detached from the latch ring portion. The structural rigidity of these portions is increased by an interlocking support structure comprising a detent tab 50 which is rigidly dependent from the latch ring portion 30 in diametric opposition to U shaped opening 44, and a pull tab 52, which is dependent from cap portion 20, being connected thereto by a live hinge 54. Pull tab 52 has a window opening 56 therethrough, and is movable between a first position, as seen in FIG. 5 for example, and a second position as seen in FIGS. 1, 2 and 6 wherein the detent tab 50 enters into window opening 56. The detent tab 50 has a shouldered edge 60, and the window opening 56 is defined in part with a cooperating shouldered edge 62, which edges act to snap retain the pull tab 52 in its second or closed position in interlocked relation with the detent tab. An adhesive seal 64 is suitably disposed to bridge across detent tab 50 and pull tab 52 following their assembly together.

The cover 24 of cap portion 20 is generally in the form of a flat dome, and a stopper 66 is downwardly dependent therefrom. Stopper 66 has a tubular cross-section, with a portion 68 of maximum diameter intermediate the axial ends of the stopper.

Cap portion 20 is provided with a first plurality of bottle neck gripping ribs 70 disposed on inwardly directed surface 26 of the cap portion about a diameter adjacent to lower margin 22 thereof, and a second plurality of bottle neck gripping ribs 72 disposed on a second diameter of the cap portion intermediate the cover 24 and the lower margin portion.

The structure of closure 10 as described is such that the closure is moldable in one piece, with teeth 38 angled inwardly upwardly as illustrated, which avoids the necessity of a separate operation to re-form the teeth following the initial molding step. This unitary operation, coupled with the provision of portals 40, permits the diameter of the inwardly directed surface 34 of latch ring portion 30 to be closely controlled so as to provide a close friction fit for the latch ring portion over the neck of a bottle with the greatest design diameter, while permitting its use with a bottles with smaller necks within the normally anticipated tolerance range.

In using closure 10, it will be prepared following molding by swinging pull tab 52 downwardly into snap engagement with detent tab 50, and seal 64 applied thereto, following which any disengagement of the pull tab will tear the seal and provide visible evidence of tampering. Prepared closure 10 will be applied to bottle B using generally standard bottle capping machinery with only minor modifications by merely pushing the cover onto the neck of the bottle. This will cause teeth 38 to latch beneath shoulder S of the bottle, whereby the closure 10 will be removable under most circumstances only following the destruction of the integrity of the latch ring portion, and producing obvious signs of tampering. The fitting of closure 10 in this manner will cause stopper 60 to enter into neck N of the bottle and be compressed to form a tight liquid seal. Depending upon the depth of shoulder S below the upper rim of bottle B, gripping ribs 64 or 66 will engage behind the shoulder, to assist in retaining the closure 10 in position. To remove closure 10 from the bottle initially, pull tab 52 will be disengaged from detent tab 50, thereby breaking seal 64, following which the pull tab will be swung forwardly about live hinge 54, to provide a graspable appendage through which a levered force may be applied to rupture frangible tabs 42. Cap portion 20 will tend to pivot about its rearward extension 48, and the rupturing force applied to pull tab 52 will serve to progressively break the frangible tabs, thereby permitting cap portion 20 to be removed from the bottle. The rupture of those frangible tabs 42 which bridge between the U shaped opening 42 of the latch ring portion 30 and the cap portion will permit the latch ring portion to be removed from the neck of the bottle in a transverse manner under a negligible force, and this removal is likely to arise at the time when a user first removes the cap portion 20 from bottle B. Where the latch ring portion 30 is not removed by the user, the forces to which the bottle is exposed in normal bottle washing operations will be generally such as to procure its removal without necessitating any modifications. The stopper 66 and gripping ribs 70 or 72 permit the cap portion 20 to be used to provide an effective re-closure for bottle B.

We claim:

1. A one piece molded tamper resistant push on closure suitable for closing a glass bottle comprising:

a latch ring portion having an upper and lower peripheral margin and an inwardly directed surface extending therebetween;

a plurality of resiliently deformable teeth depending from said latch ring portion in an upwardly inwardly direction relative to said inwardly directed surface;

a cap portion having a lower peripheral margin and an inwardly directed surface extending from said lower margin thereof;

a plurality of frangible tabs interconnecting said cap portion and said latch ring portion;

a detent tab forwardly disposed on said latch ring portion;

a pull tab hingedly connected to said cap portion to be movable between a first position wherein said pull tab is engaged with said detent tab and a second position wherein said pull tab projects outwardly from said cap portion to permit said pull tab to be grasped whereby a suitable manual force applied thereto will progressively rupture said frangible tabs and permit said cap to be removed from said bottle when said closure is applied thereto.

2. A closure as defined in claim 1 wherein said cap portion includes a flat dome and a stopper downwardly depending therefrom for engaging within the neck of a bottle to provide a liquid tight seal therewith.

3. A closure as defined in claim 2 wherein said stopper has a tubular cross section.

4. A closure as defined in claim 3 wherein said tubular cross section has a maximum diametric dimension intermediate the axial tends of said stopper.

5. A closure as defined in claim 2 wherein said inwardly directed surface of said cap portion is provided with a first plurality of ribs disposed on a first diameter thereof, which plurality of ribs is positioned to engage a first undercut in the neck of said bottle and assist in retaining said cap portion in a closed position thereon following the rupture of said frangible tabs.

6. A closure as defined in claim 5 wherein said inwardly directed surface of said portion cap is provided with a second plurality of ribs disposed on a second diameter thereof, which second plurality of ribs is positioned to engage a second undercut of said bottle and assist in retaining said cap in a closed position thereon following the rupture of said frangible tabs.

7. A closure as defined in claim 1 wherein said pull tab and said detent tab are provided with cooperating shoulders which act to retain said detent tab and pull tab in engagement.

8. A closure as defined in claim 7 wherein said pull tab is in the form of a ring which generally surrounds said detent tab when in engagement therewith.

9. A closure as defined in claim 8 including an adhesive seal which interconnects said pull tab and said detent tab when they are assembled in engaged relationship, which seal will break when said pull tab is first disengaged from said detent tab.

10. A one piece molded tamper resistant push on closure as defined in claim 9 wherein said seal is an adhesive seal.

11. A closure as defined in claim 1 wherein each of said teeth has associated therewith a blind portal to permit said teeth to enter into respective ones of said portals as said latch ring is engaged onto the neck of a bottle.

12. A closure as defined in claim 1 wherein said frangible tabs interconnect upper peripheral marginal portions of said latch ring portion and lower peripheral marginal portions of said cap portion.

13. A closure as defined in claim 1 wherein said latch ring portion is in the form of an annulus which opens when said frangible tabs are ruptured to detach said cap portion from said latch ring portion, thereby permitting said latch ring portion to be removed from the neck of a bottle in a transverse direction.

14. A one piece molded tamper resistant push on closure suitable for closing a glass bottle comprising:

a latch ring portion and a cap portion;

said latch portion including a plurality of upwardly inwardly angled teeth for snap retaining said latch ring portion beneath a shoulder associated with said bottle when said closure is pushed onto said bottle, while restricting the detachment of the closure therefrom;

a plurality of frangible tabs connecting said latch ring portion to said cap portion;

some of said frangible tabs serving to retain said latch ring portion in the form of a closed annulus;

the detachment of said cap portion from said latch ring portion by rupturing said frangible tabs serving to open said annulus to permit said latch ring portion to be moved transversely from engagement above the neck of said bottle;

wherein said cap portion includes a pull tab disposed on a peripheral portion thereof and a downwardly directed appendage generally diametrically opposed to said pull tab to which appendage said some of said frangible tabs are connected; and wherein said latch ring portion includes a detent tab releasably mated with said pull tab.

15. A one piece molded tamper resistant push on closure as defined in claim 14 including a seal which interconnects said pull tab and said detent tab when mated together, which seal will break when said pull tab is first released from mating engagement with said detent tab.

16. A one piece molded tamper resistant push on closure as defined in claim 15 wherein said seal is an adhesive seal.

* * * * *